United States Patent
Certo et al.

(10) Patent No.: US 8,720,652 B2
(45) Date of Patent: May 13, 2014

(54) BRAKE RETRACTION UTILIZING ACTIVE MATERIAL ACTUATION

(75) Inventors: Domenic Certo, Newcastle (CA); Alan L. Browne, Grosse Pointe, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 636 days.

(21) Appl. No.: 12/534,365

(22) Filed: Aug. 3, 2009

(65) Prior Publication Data

US 2010/0193299 A1 Aug. 5, 2010

Related U.S. Application Data

(60) Provisional application No. 61/085,843, filed on Aug. 2, 2008.

(51) Int. Cl.
*F16D 55/22* (2006.01)
(52) U.S. Cl.
USPC ........................... 188/72.3; 188/72.7
(58) Field of Classification Search
CPC ............ F16D 2121/28; F16D 2121/30; F16D 2121/32; F16D 2121/34; F16D 2123/00; F03G 7/065

USPC ................. 188/72.7, 72.3, 158, 106 F, 79.51, 188/79.52, 72.1; 310/307

See application file for complete search history.

(56) References Cited

U.S. PATENT DOCUMENTS

| | | | | |
|---|---|---|---|---|
| 4,629,039 A * | 12/1986 | Imoto et al. | ... | 188/72.1 |
| 5,067,778 A * | 11/1991 | Testardi | ... | 303/113.1 |
| 5,079,920 A * | 1/1992 | Whitehead et al. | ... | 60/527 |
| 5,396,769 A * | 3/1995 | Brudnicki | ... | 60/528 |
| 6,374,608 B1 * | 4/2002 | Corris et al. | ... | 60/528 |
| 6,462,463 B1 * | 10/2002 | Audren | ... | 310/328 |
| 6,830,141 B1 * | 12/2004 | Neelakantan et al. | ... | 192/84.6 |
| 6,832,477 B2 * | 12/2004 | Gummin et al. | ... | 60/527 |
| 6,877,589 B2 * | 4/2005 | Ikeda | ... | 188/79.52 |
| 2003/0214746 A1 * | 11/2003 | Oh et al. | ... | 360/74.1 |
| 2004/0251092 A1 * | 12/2004 | Kramer et al. | ... | 188/72.1 |
| 2005/0001367 A1 * | 1/2005 | Taya et al. | ... | 267/166 |
| 2005/0023086 A1 * | 2/2005 | Szilagyi | ... | 188/67 |
| 2005/0274580 A1 * | 12/2005 | Hageman et al. | ... | 188/158 |
| 2007/0204613 A1 * | 9/2007 | Alacqua et al. | ... | 60/527 |

* cited by examiner

*Primary Examiner* — Bradley King
*Assistant Examiner* — Stephen Bowes

(57) ABSTRACT

A braking system comprising a reconfigurable caliper piston adapted for, and a method of, retracting a brake pad utilizing active material actuation.

6 Claims, 4 Drawing Sheets

US 8,720,652 B2

BRAKE RETRACTION UTILIZING ACTIVE MATERIAL ACTUATION

RELATED APPLICATIONS

This patent application claims priority to, and benefit from U.S. Provisional Patent Application Ser. Nos. 61/085,843, entitled "BRAKE RETRACTION UTILIZING ACTIVE MATERIAL ACTUATION," filed on Aug. 2, 2008; the disclosure of which is incorporated by reference herein.

BACKGROUND OF THE INVENTION

1. Technical Field

The present invention relates to braking systems, and methods of retracting a brake pad from a rotor, and more preferably, to a system for and method of retracting a brake pad utilizing active material actuation.

2. Background Art

It is known in the art to engage a brake pad and rotating rotor (or "disk") to effect a braking force when a body, such as a vehicle, is in motion; and to further cause the retraction of the brake pad when braking force is undesired (e.g., during cruise conditions). Conventionally, mechanical, electro-mechanical, and hydraulic systems have been developed to that end. Of these, one type of conventional system features a hydraulically driven floating caliper/single-piston configuration wherein the pads are not actively retracted from the disk. Instead, a rubber piston seal and/or wobble in the rotor works to pull/push the pads a small distance away from the rotor; however, brake drag (i.e., light contact remaining between the pad and rotor after actuation) is still often experienced. Other conventional systems utilize a seal groove and caliper/pad retraction springs to aid in reducing brake drag but do not completely eliminate the condition.

Of further concern in the art, when the vehicle is in park, these prior art systems typically do not separate the pad from the rotor. This increases the likelihood of corrosion, and as a consequence, thickness variation in the rotor. Thickness variation may, in turn, result in brake pulsation; a nuisance often experienced by drivers. Finally, other concerns in the art involve tradeoffs between pedal travel and caliper hold-off pressure.

BRIEF SUMMARY

The present invention presents an active brake retraction system, and particularly, an inventive caliper that addresses the above-referenced concerns. Among other things, the invention is useful for reducing brake drag and thereby increasing fuel economy. The invention is also useful for separating the brake pad and rotor when a vehicle is not in use (i.e., in park), which thereby reduces pad to rotor corrosion and therefore corrosion induced thickness variation.

The inventive caliper is described and illustrated with respect to a braking system including a cylinder, piston, brake pad, and rotor. The caliper includes a hollow cylinder securable relative to the rotor, and a piston translatable relative to the cylinder. The piston includes an outer shell, and a member translatable relative to the shell and fixedly attached to the pad. For example, the member may be a plunger, screw, or telescoping stack of extensions. The piston further includes at least one active material element drivenly coupled to the member, and configured to cause the member to translate between deployed and retracted conditions, in response to an activation signal.

In a preferred mode of operation, as the piston and member are caused to travel outward by a pressure, the pad is caused to engage the rotor, so as to effect a braking force. Once engaged and the pressure is ceased, the element is activated, such that the member is caused to bear against the rotor and piston shell, thereby driving the shell (and hydraulic fluid) away from the rotor. The element is then deactivated to allow the member and pad to recede into the cylinder and away from the rotor. Thus, in a second aspect of the invention, a method of selectively retracting a pad from a rotor utilizing active material actuation is presented.

Other aspects and advantages of the present invention, including the employment of at least one shape memory alloy wire as the active material element, and other configurations will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures of exemplary scale, wherein.

DETAILED DESCRIPTION

Figure 1:
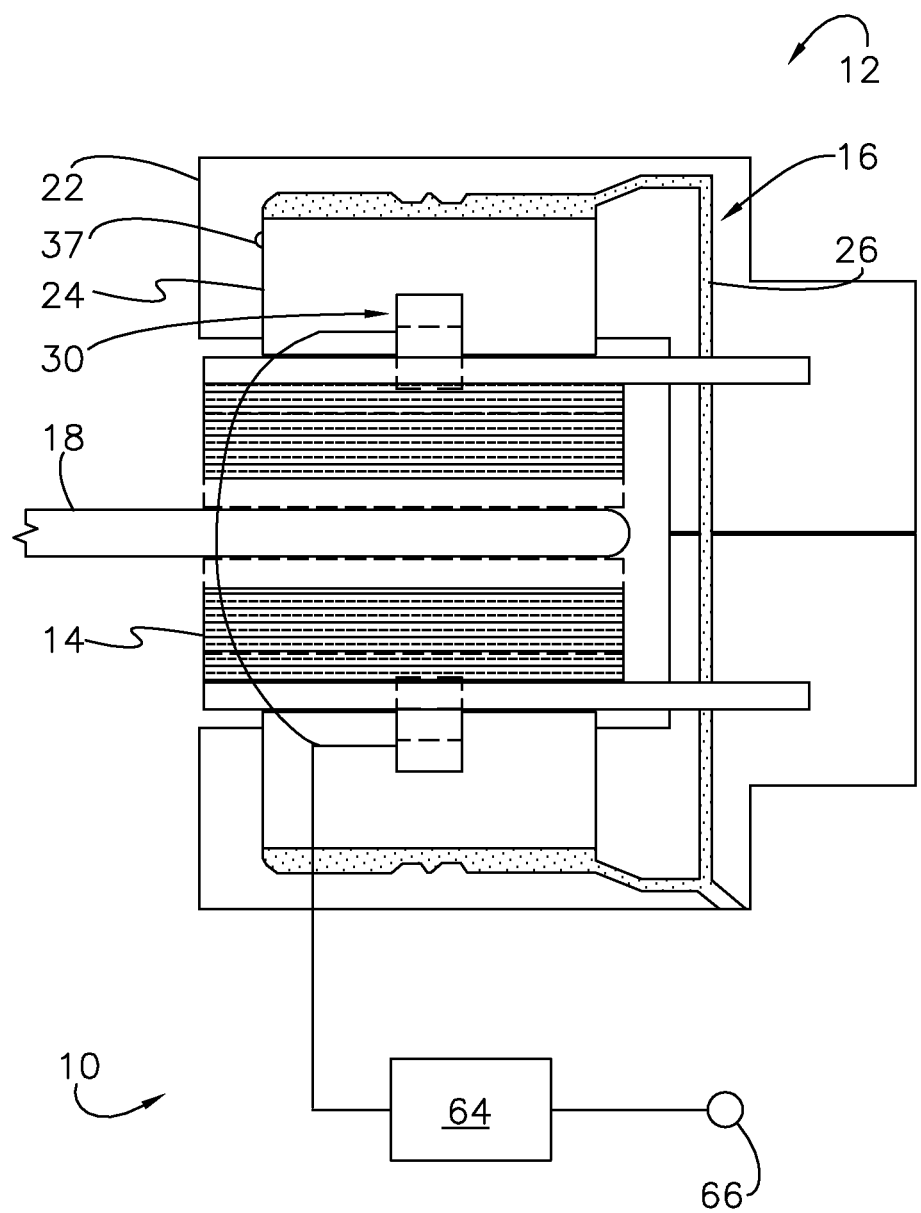
FIG. 1 is a cross-section of a system, including a partial rotor, brake pads, and caliper, in accordance with a preferred embodiment of the invention.

The present invention concerns a disk braking system 10 having active pad retraction functionality intended and configured to address the afore-mentioned concerns of the prior art, including brake drag, and pad/rotor corrosion. The inventive system 10 may be of the type used in automotive applications that feature a caliper 12, opposite first and second brake pads 14, a hydraulic drive 16 drivenly coupled to the caliper 12 and pads 14, and a rotor (or "disk") 18 intermediately disposed between and selectively engagable by the pads 14. Preferred embodiments described and illustrated herein present an inventive caliper 12; however, it is appreciated that the present invention encompasses the use of active material actuation to effect brake pad retraction in general, such that the active material actuation may be performed or embodied by any component of the braking system 10.

The invention may be utilized with other types of braking systems that benefit from active brake retraction; and as such, is not limited to the configurations and uses described herein. The system 10 utilizes active material actuation, and thereby includes an active material element 20 that is configured to drive retraction when activated or deactivated.

I. Active Material Description and Functionality

The term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Suitable active materials for use with the present invention include but are not limited to the class of active materials known as shape memory materials.

Exemplary shape memory materials include shape memory alloys (SMA), electroactive polymers (EAP), ferromagnetic SMAs, electrorheological (ER) and magnetorheological (MR) elastomers, dielectric elastomers, piezoelectric polymers, piezoelectric ceramics, various combinations of the foregoing materials, and the like. Depending on the particular active material, the activation signal can take the form of, without limitation, an electric current, an electric field (voltage), a temperature change, and the like.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or Martensite phase, shape memory alloys can be pseudo-plastically deformed and upon exposure to some higher temperature will transform to an Austenite phase, or parent phase, returning to their shape prior to the deformation. Materials that exhibit this shape memory effect only upon heating are referred to as having one-way shape memory.

Shape memory alloys exist in several different temperature-dependent phases. The most commonly utilized of these phases are the so-called Martensite and Austenite phases discussed above. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the Martensite phase to the Austenite phase, as well as an additional shape transition upon cooling from the Austenite phase back to the Martensite phase. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system 10 with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable.

The active material element 20 may also comprise an electroactive polymer such as ionic polymer metal composites, conductive polymers, piezoelectric material and the like. Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material configured as an actuator for providing rapid deployment. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

Finally, electrorheological and Magnetorheological compositions, such as ER and MR elastomers are "smart" materials whose rheological properties rapidly change upon application of an electric potential or magnetic field. MR elastomers, for example are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR elastomers typically develop structure when exposed to a magnetic field in as little as a few milliseconds. Discontinuing the exposure of the MR elastomers to the magnetic field reverses the process and the elastomer returns to its lower modulus state.

II. Exemplary Active Brake Retraction Configurations and Use

Returning to the structural configuration of the invention, preferred embodiments of the inventive caliper 12 are variously shown in FIGS. 2-9. In each of the embodiments, the caliper 12 includes a hollow cylinder 22 that is communicatively coupled at one end to the hydraulic drive 16, and open at the other end. The caliper 12 further includes a reconfigurable piston 24 coaxially aligned with, disposed within, and translatable relative to the cylinder 22. The piston 24 is fixedly attached to the brake pad 14, and as such presents an attached end that translates between an applied position spaced from the open end of the cylinder 22 and configured to engage the pad 14 and rotor 18, and a retracted position preferably flush with the open end of the cylinder 22, when functioning properly.

More particularly, as is conventionally the case, hydraulic fluid 26 is used to convert a force applied to the brake pedal (not shown) by a user (also not shown) into pressure within the cylinder 22 and against the piston 24, such that the piston 24 and cylinder 22 are sealingly engaged. Alternatively, it is appreciated that pneumatic or otherwise pressure may be utilized. The pressure causes the piston to travel outwards within the cylinder and the pad 14 to engage the rotor 18. Once the force is removed, the pressure is discontinued, allowing the piston to retreat. As previously mentioned, however, it is appreciated that residual fluid pressure after a braking event often causes the pad to remain in the applied position, so as to clean the rotor, but that said residual engagement may result in brake drag, or pad/rotor corrosion when the vehicle is sedentary for an extended period of time.

Figure 2:
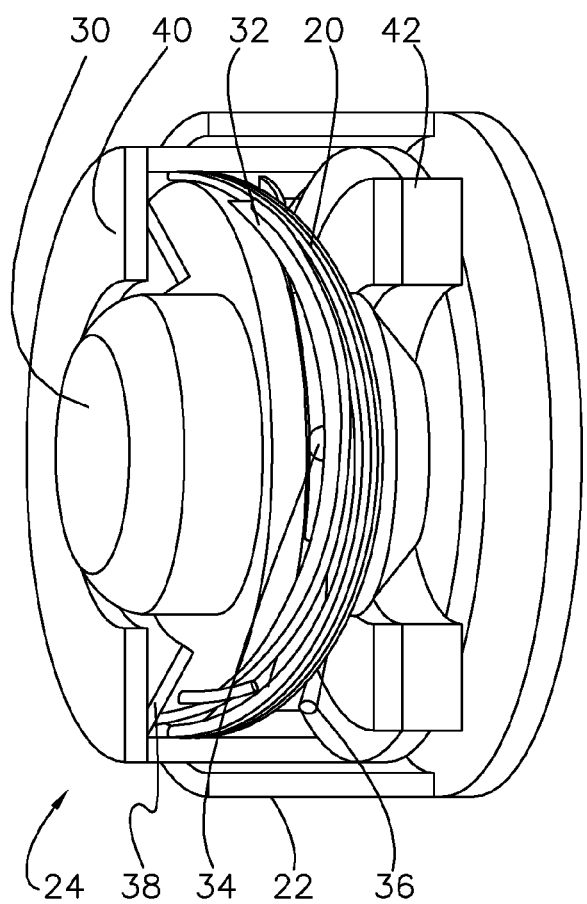
FIG. 2 is a perspective view of a caliper, particularly illustrating via cut-out a translatable plunger, rotatable plate and shape memory wire actuator drivenly coupled to the plate, in accordance with a preferred embodiment of the invention.
Figure 3:
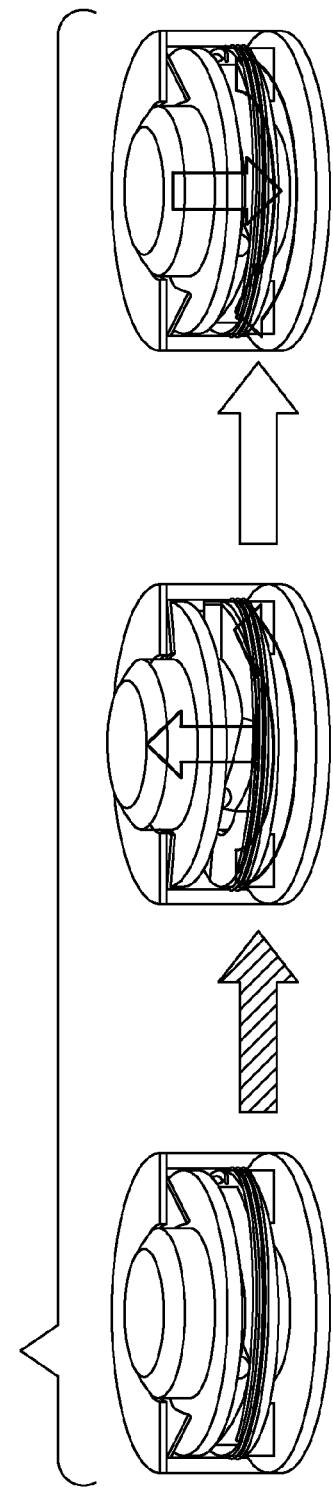
FIG. 3 is a progression of the caliper shown in FIG. 2 from a deactivated retracted condition, to an activated extended condition, and back to the retracted condition.
Figure 4:
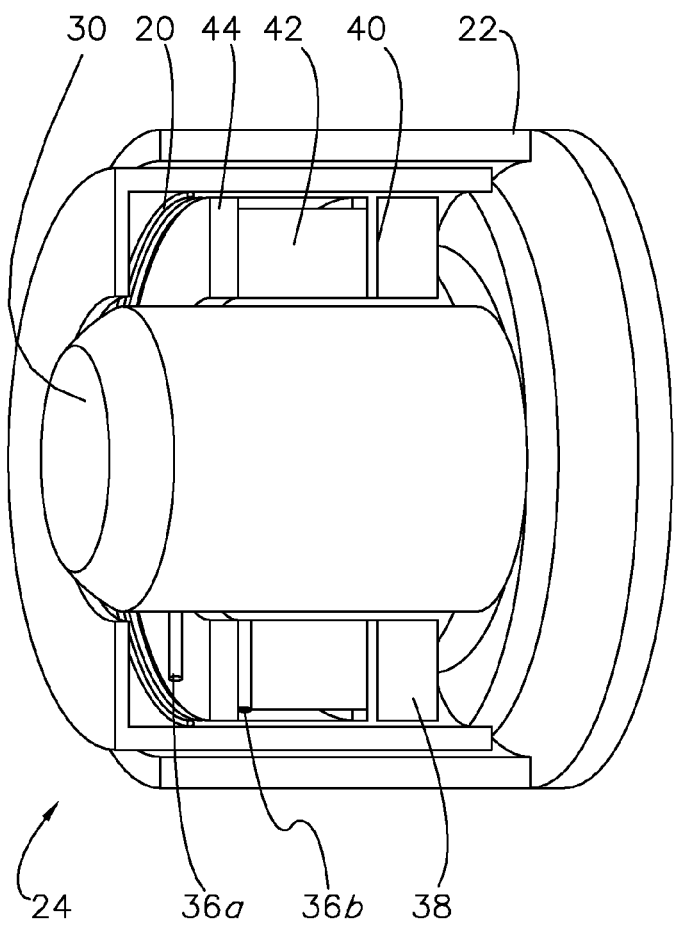
FIG. 4 is a perspective view of a caliper, particularly illustrating via cut-out a translatable screw, lead nut, and shape memory wire actuator drivenly coupled to the nut, in accordance with a second preferred embodiment of the invention.
Figure 5:
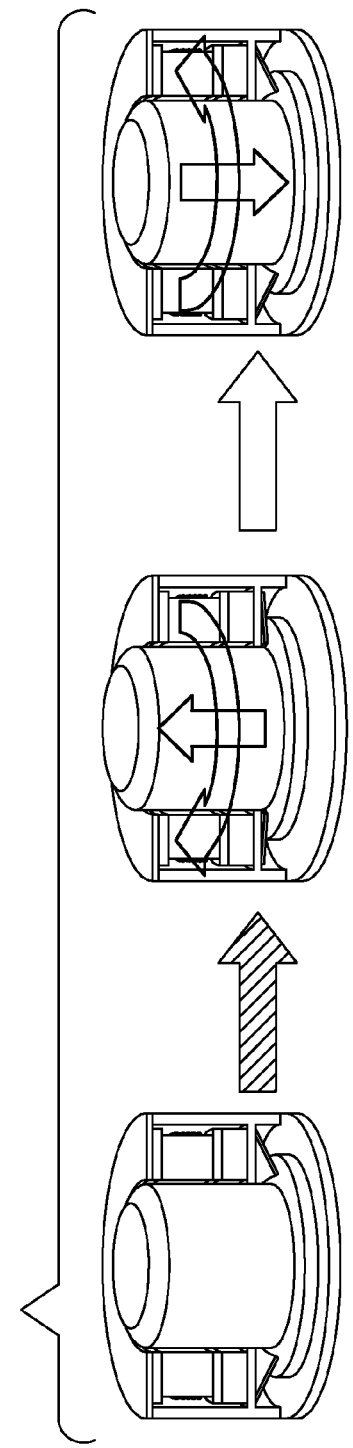
FIG. 5 is a progression of the caliper shown in FIG. 4 from a deactivated retracted condition, to an activated extended condition, and back to the retracted condition.
Figure 6:
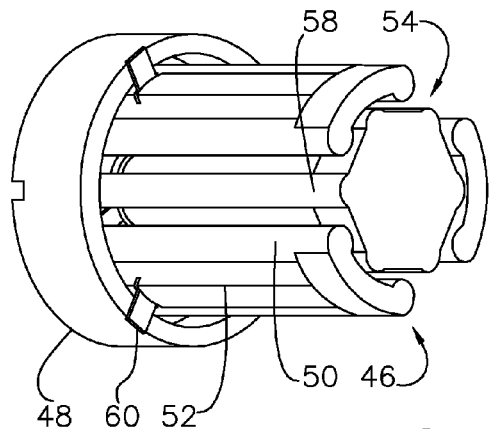
FIG. 6 is a perspective view of a telescoping caliper piston having first and second extensions comprising rigid rods, shape memory bundles, and spring steel sets, in accordance with a third preferred embodiment of the invention.
Figure 7:
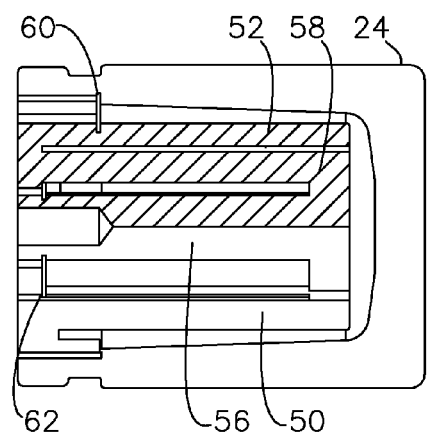
FIG. 7 is a lateral cross-section of the piston shown in FIG. 6.
Figure 8:
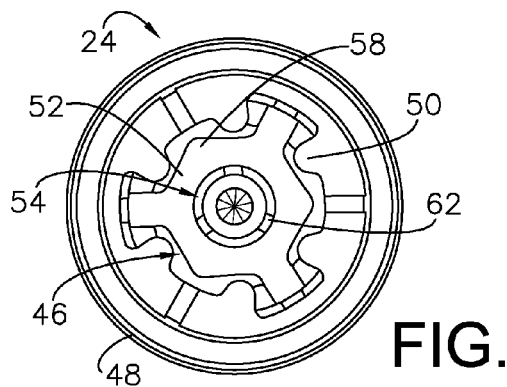
FIG. 8 is a longitudinal cross-section of the piston shown in FIG. 6.

In the present invention, the reconfigurable piston 24 is operable to push off of the rotor 18, so as to selectively cause translation towards the retracted position, and in this manner, effect brake pad retraction. To that end, the piston 24 further comprises an outer shell 28, and member 30 translatable relative to the shell 28. The member 30 is fixedly attached to the pad 14 at a distal end exterior to the open end of the cylinder 22. In FIGS. 2 and 3, the member 30 presents a plunger concentric with the shell 28. A sloped plate 32 is concentrically aligned and disposed beneath the plunger 30. A ball bearing (or a roller attached to the plunger) 34 intermediately engages the plunger 30 and plate 32, and rollingly engages the two. As the plate 32 rotates, the bearing 34 and therefore the plunger 30 is caused to linearly translate towards a deployed or retracted condition. Finally, the plate 32 rides upon a thrust bearing or roller pin 36.

As shown in FIG. 2, the active material element may comprise at least one, and more preferably for redundancy, a plurality of shape memory alloy wires 20 that are wound about the plate 32 and fixedly attached to the shell 28. More particularly, the SMA wires 20 are wrapped counter-clockwise around the ramped actuation plate 32 and attached to the plate 32. As the wires 20 are heated, they contract, rotating the plate 32 clockwise between a thrust bearing 36 and the plunger 30. The wires 20 are preferably activated by an electric current through Joule heating. As used herein the term "wire" shall encompass other equivalent geometric forms suitable for use as a flexible tensile actuator, including but not limited to braids, cables, ropes, etc. The wire 20 is depicted, herein, as being wrapped, however, it is appreciated that a linear wire, a bowstring, or another configuration may be equally employed to effect the intended displacement. Finally, it is understood that a wire wrapped in a clockwise configuration and resultant opposite rotation would be equally effective, and that the two directions are interchangeable throughout this disclosure.

Because the pad 14 already bears against the rotor 12 due, for example, to the residual pressure, it is appreciated that the member (e.g., plunger) 30 is prevented from further outward translation relative to the open end of the cylinder 22. As such, when the wire 20 is activated, the shell 28 will be caused to translate inwardly into the cylinder 22, thereby pushing fluid 26 back up the line. Once the wire 20 is deactivated, the plunger 30 retracts into the shell 28 thereby pulling the pad 14 away from the rotor 18. The shape memory alloy is allowed to retract to its non-activated state, by releasing heat to the surrounding environment. More preferably, the shell 28 and cylinder 22 may cooperatively define a detent 37 (FIG. 1), so as to retain the shell in the retracted position, while the member 30 recedes therein.

Where the element 20 presents one-way actuation, a return mechanism 38 is provided to rotate the plate 32 clockwise and drive the plunger 30 back towards the retracted condition when the element 20 is deactivated. In FIG. 2, the return 38 presents a disk or wave spring concentrically aligned with the plunger 30 and disposed between the plunger 30 and an upper travel stop 40 defined by the shell 28. As such, it is appreciated that extending the plunger 30 relative to the shell 28 simultaneously compresses the spring 38. This stretches the slack SMA wires 20 to their original length further causing them to transition back to the deactivated Martensitic phase.

Finally, in case the member (e.g., plunger) 30 is blocked from moving outward, an overload protection mechanism 42 is preferably provided to present a secondary output path. In FIG. 2, the mechanism 42 comprises an elastomeric disk disposed beneath the thrust bearing 36. The elastomeric disk 42 allows the plate 32 to still rotate when the SMA wires 20 are activated but the plunger 30 and shell 28 are unable to relatively translate, thereby protecting them from damage. That is to say, in this instance, the slope of the ramp exerts a downward force upon the thrust bearing 36 causing the disk 42 to compress.

In a second embodiment, the inventive caliper 12 includes an SMA screw type actuator, wherein the member 30 is a screw and the plate 32 is replaced by a ball or lead nut 44 (FIGS. 4-5) threadably engaged with the screw 30. Here, the SMA wires 20 are again connected at one end to the inner wall of the shell 28, wrapped counter-clockwise around the nut 44 and attached to the nut 44. As the wires 20 are heated, they contract, rotating the nut 44 clockwise between two thrust bearings 36a,b; the first 36a between the shell 28 and the nut 44, and the second 36b between the nut 44 and an elastomeric overload protection disk 42. This extends the screw 30 out of the shell 28, and towards the brake rotor 18. A disk or wave return spring 38 is disposed beneath an outbound travel stop 40 and the flanged lower end of the screw 30. The return spring 38 is simultaneously compressed as the screw 30 is caused to extend.

Once power is cut to the SMA wires 20, they cool and become slack. The return spring 38 then pushes the screw 30 inward, rotating the nut 44 counter-clockwise and stretching the SMA wires 20 to their original length. In case the screw 30 is blocked from moving outward relative to the shell 28, the overload protection mechanism 42 compresses and allows the nut 44 to still rotate when the SMA wires 20 contract, protecting them from damage.

In a third embodiment, the piston 24 includes a multi-stage telescoping member 30, which preferably allows for different magnitudes of retraction (FIGS. 6-9). More particularly, the member 30 herein comprises a plurality of extensions, exemplarily depicted as two in the illustrated embodiment. The extensions are concentric with the cylinder, and radially disposed relative to each other. Preferably, each extension is separately controllable.

The first and radially exterior extension 46 is slidably engaged to a thread 48 that mates with the shell 28 (FIGS. 6-9). The extension 46 includes a first set of shape memory wire bundles 50, preferably comprising Martensitic SMA, which are connected at their upper ends to the thread 48 and at their opposite ends to a first set of laterally adjacent rigid rods 52. When the first bundles 50 are activated they are caused to contract, further causing the rods 52 to move out of the shell 28. The first set of bundles 50 are also connected to the second extension 54, and more particularly, to a second set of rigid rods 56 comprising the same. As such, when activated, the first set of bundles 50 also lifts the second extension 54 to the first stage. It is appreciated that, similarly, for a greater plurality of extensions, it is appreciated that each extension is drivenly coupled to the radially interior extension(s).

Figure 9:
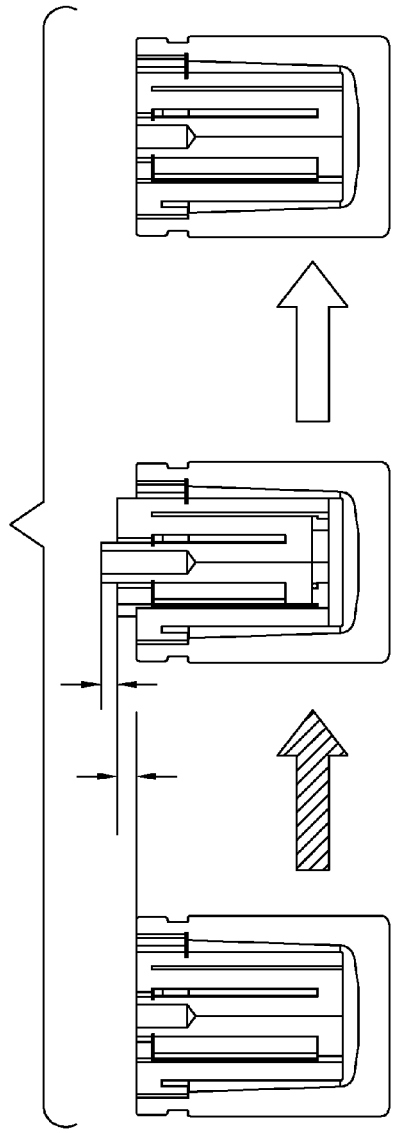
FIG. 9 is a progression of the piston shown in FIG. 8 from a deactivated retracted condition, to a fully activated extended condition, and back to the retracted condition.

The second set of rods 56 are fixedly coupled to a second set of wire bundles 58, again preferably comprised of SMA. When the second set of bundles are activated, they contract causing the second set of rigid rods 56 to move further out of the shell 28 relative to the first set of rigid rods 52 and to a second stage (FIG. 9). In a preferred embodiment, the first and second sets of bundles 50,58 can be actuated together or independently depending on the requirement. To effect overload protection, the first and second set of rods 52,56 preferably include elastomeric (or otherwise compressible) longitudinal sections 42 integrated therein. Here, the elastomeric mechanism 42 protects the shape memory bundles 58 from overloading by compressing or buckling when the extensions 46,54 are unable to translate relative to the shell 28.

Finally, first and second spring steel sets 60,62 are configured to engage the first and second extensions 46,54, respectively, so as to act as returns. More particularly, when the bundles 50,58 are deactivated, they are caused to retract by the first and second spring steel sets 60,62, which release energy stored during the outward translation of the extensions 46,54. It is appreciated that various other spring configurations (e.g., compression, extension, etc.) may alternatively be utilized.

In operation, it is appreciated that the anticipatory temperature range to be encountered by the system 10, during driving conditions, is generally between 150° and 300° C. and that sudden stop or aggressive driving conditions may approach and/or surpass the upper end of this range. As such, to enable passive actuation, thermally activated elements 20 should preferably present transition temperatures within this range and more preferably retain memory properties up to the maximum range temperature. Where temperatures at and above the upper end of the range are abusive to the elements 20, it is desirable to insulate these elements 20 from the heat generated during aggressive stop conditions.

In a preferred embodiment, an activation signal source 64 (FIG. 1) is coupled to the active material element 20 and configured to selectively (e.g., manually or in response to sensory input) generate an activation signal. The source 64, for example, may be the charging system of the vehicle, that is controllably coupled to the element 20 through conductive leads. The source 64 may be directly or indirectly operable. With respect to the latter, the leads preferably engage the element 20, for example, by delivering an electric current through the resistance of the element. Alternatively, it is appreciated that the signal may be provided by the ambient environment or a contacting fluid, such that the element 20 is passively activated.

In a preferred embodiment, the system 10 further includes a sensor 66 operable to determine a condition (FIG. 1) and communicatively coupled to the element 20. The system 10 is configured such that the element 20 is activated only upon determination of the condition. For example, a sensor 66 communicatively coupled to the rotor 18 or drive axle (not shown) may be operable to detect a brake drag condition, such that the element 20 is activated only when brake drag is detected.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. A brake caliper adapted for selectively retracting a brake pad from a rotor, comprising:
    an open cylinder securable relative to the rotor; and
    a piston interiorly translatable within and relative to the cylinder, and including:
        an outer shell;
        a member translatable relative to the shell and fixedly attached to the pad, such that the member is configured to cause the pad to translate between a deployed condition, wherein the pad engages the rotor, and a retracted condition, wherein the pad is spaced from the rotor, when the member is caused to translate relative to the shell, wherein the member presents a plunger translatably engaged with the shell and defining a longitudinal axis;
        a rotatable sloped plate drivenly coupled to the plunger, defining an axis of rotation parallel with the longitudinal axis, and configured to cause the plunger to linearly translate as a result of rotation; and
        an active material element operable to undergo a reversible change in shape when exposed to and occluded from an activation signal, so as to activate and deactivate the element respectively, and drivenly coupled to the member, such that the member is caused to translate as a result of the change, and such that the member is caused by the active material element to pull the pad away from the rotor when translating from the deployed condition to the retracted condition;
        wherein the element is formed of a material selected from the group consisting of shape memory alloys, electroactive polymers, ferromagnetic SMAs, electrorheological elastomers, and magnetorheological elastomers.

2. The caliper as claimed in claim 1, wherein the piston defines at least one travel stop configured to limit pad translation to one of said deployed and refracted conditions.

3. The caliper as claimed in claim 1, wherein the piston further includes an overload protector drivenly coupled to the element opposite the member, and configured to present a secondary work output path, when the element is caused to undergo the change and the member is unable to translate relative to the shell.

4. The caliper as claimed in claim 1, wherein the element presents at least one shape memory alloy wire wound about the axis, fixedly connected to the plate and shell, and configured to cause the plate to rotate as a result of the change.

5. The caliper as claimed in claim 1, wherein the piston further includes a ball bearing intermediately coupling the plate and plunger, the bearing rollingly engages the plate and plunger, the rotation of the plate causes the bearing to vertically translate, and the vertical translation of the bearing causes the plunger to vertically translate.

6. The caliper as claimed in claim 1, wherein the piston further includes an elastomeric overload protection disk and a thrust bearing rollingly engaging and intermediate the disk and plate.

* * * * *